May 24, 1960 M. C. STEELE 2,938,160

SWITCHING DEVICES

Filed June 11, 1958 2 Sheets-Sheet 1

INVENTOR.

MARTIN C. STEELE

BY Morris A. Rabkin

ATTORNEY

May 24, 1960 M. C. STEELE 2,938,160

SWITCHING DEVICES

Filed June 11, 1958 2 Sheets-Sheet 2

INVENTOR.
MARTIN C. STEELE
BY Morris A. Rabkin
ATTORNEY 2,938,160

SWITCHING DEVICES

Martin C. Steele, Princeton, N.J., assignor to Radio Corporation of America, a corporation of Delaware Filed June 11, 1958, Ser. No. 741,391

17 Claims. (Cl. 323—94)

This invention relates to switching devices, and more particularly to devices for controlling the current in a circuit wherein the controlling element exhibits the property of magneto-resistance. By magneto-resistance is meant the property of some substances to vary their resistance in accordance with the strength of a magnetic field applied to it. The switching devices of the present invention are particularly useful in computer circuits and the like.

It had been proposed to control the flow of current in a circuit by devices whose operation depends upon a sudden change in the resistivity of some semiconductors under conditions that will produce the phenomenon of impact ionization therein. These devices employ a so-called impact ionization diode that comprises a semiconductor having a critical impurity level. At a temperature of liquid helium, the resistivity of these impact ionization diodes may vary from $10^7$ ohm-cm. to $10^2$ ohm-cm., for example, depending upon the strength of the magnetic field applied to the impact ionization diode. While impact ionization diodes are satisfactory for certain applications of switching and current control, the criticalness of fabrication of the impact ionization diode, its relative cost, impedance range, and speed of operation are characteristics that the instant invention tends to improve.

Accordingly, it is an object of the present invention to provide improved switching devices suitable for high speed switching of the order of kilomegacycles per second.

It is another object of the present invention to provide improved means for controlling the current in a circuit that may operate as a pulse amplifier.

Still another object of the present invention is to provide improved means for controlling the current in a circuit that may function as a signal generator.

A further object of the present invention is to provide improved switching devices whose operation depends upon the change in the magneto-resistance of a single crystal of certain substances under proper conditions of temperature and crystal orientation.

Still a further object of the present invention is to provide improved switching devices whose resistivity varies in the neighborhood of $10^{-6}$ to $10^{-3}$ ohm-cm. under predetermined conditions of temperature and magnetic field, whereby current in relatively low impedance loads may be controlled.

Still a further object of the present invention is to provide improved switching devices that employ single crystals of substances that are relatively cheaper and easier to fabricate than the semiconductors employed in impact ionization diodes.

In accordance with the present invention the foregoing objects and related advantages are attained through novel current controlling devices employing a single crystal of bismuth that exhibits strong magneto-resistance properties when properly oriented in a magnetic field at relatively low temperatures. For example, in a novel switching device, a body of bismuth formed from a single crystal is inserted in a circuit so that current will flow in the direction of the trigonal axis of the crystal. In the absence of a magnetic field, the resistance of the bismuth is relatively low and the bismuth serves as a relatively good conductor so that current will flow in the circuit. A superconductor is disposed between a magnetic field and the bismuth crystal. The switching device is immersed in liquid helium at a temperature of about 4.2° Kelvin. The superconductor will serve to shield the bismuth crystal from the magnetic field when the superconductor is in a superconducting state. If a pulse is applied to the superconductor so that the superconductor is driven out of its superconducting state, it will no longer act as a magnetic shield and will permit the magnetic field to affect the bismuth crystal. Under these conditions, the resistance of the bismuth crystal is markedly increased and will serve to decrease the current flowing in the circuit in which it is connected. The magnetic field should be applied to the bismuth crystal in a direction perpendicular to the trigonal axis, that is, to the direction of current flowing through the bismuth crystal, and also perpendicular to one of the binary axes of the bismuth crystal.

The novel devices of the present invention may be used as a pulse amplifier by controlling large amounts of current in the circuit in which the bismuth crystal is connected with relatively small pulses in the circuit in which the superconductor is connected. Also, by subjecting the bismuth crystal to a constant magnetic field and by applying another magnetic field to the bismuth crystal in response to current through a superconductor, whereby its superconductivity is quenched, the phase of the current in the circuit containing the bismuth crystal may be controlled with respect to the phase of the current in a circuit containing the superconductor.

The invention will be described in greater detail by reference to the following description taken in connection with the accompanying drawings in which similar reference characters relate to similar parts, and in which.

Figure 1:
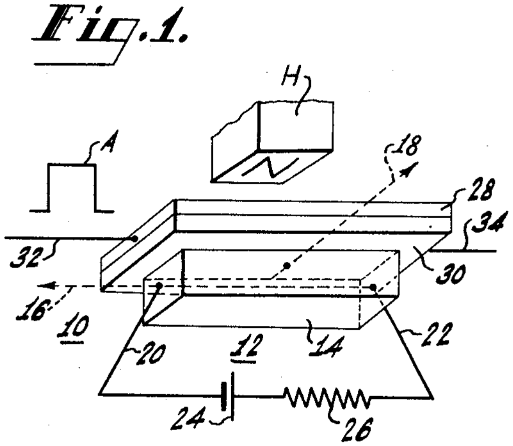
Fig. 1 is a perspective view of a novel switching device of the present invention, connected in a circuit shown in schematic form.

Referring now to Fig. 1, there is shown a switching device 10 for controlling the current flow in a closed circuit 12. The switching device 10 comprises a body 14 formed from a single crystal, such as a rhombohedral crystal of bismuth, that possesses the property of magneto-resistance at relatively low temperatures. Bismuth, for example, exhibits a most pronounced magneto-resistance in the range of temperatures including liquid helium. In a field of 22,000 gauss and at a temperature of 4.2° K., for example, the fractional change in the resistance of bismuth brought about by this magnetic field is $2.8\times10^6$. Antimony and arsenic are examples of other rhombohedral crystals, that may be used, but their magnetoresistances are much less than that of bismuth.

The body 14 may be a rhombohedral crystal of bismuth having a trigonal axis 16 extending along the longitudinal axis of the rhombohedral crystal and a binary axis 18 disposed at right angles to the trigonal axis 16. The body 14 is disposed in the circuit 12 so that current will flow through the body 14 along the trigonal axis 16 thereof. To this end, leads 20 and 22 are connected to the body 14 at opposite ends thereof, that is, at the two points where the trigonal axis intersects the surface of the body 14. The lead 20 is connected to the lead 22, in the circuit 12, through a source 24 of voltage, shown for illustrative purposes as a battery, and a load, illustrated as a resistor 26. It will now be understood that current flowing in the circuit 12 will be a function of the resistance of the body 14.

A magnetic field H, illustrated herein as the north pole of a bar magnet, is disposed near the body 14 and perpendicular to both its trigonal axis 16 and its binary axis 18. The body 14 will exhibit strong magneto-resistance when affected by the magnetic field H.

Means are provided to shield the body 14 from the magnetic field H when it is desired to have a relatively large amount of current flow in the circuit 12. To this end, a superconductor 28 is disposed between the magnetic field H and the body 14. The superconductor 28 may comprise material such as niobium or lead, for example. The superconductor 28 is insulated from the body 14 by an electrical insulator 30, such as mica or any suitable plastic, and functions as a magnetic shield to prevent the magnetic field H from affecting the body 14 when it is in a superconducting state. The entire device 10 would therefore be immersed in a coolant, such as liquid helium (not shown), so that the superconductor 28 may function as a superconductor.

Means are provided to drive the superconductor 28 out of the condition of superconductivity. To this end, a pair of leads 32 and 34 are connected to opposite ends of the superconductor 28 for the purpose of passing current therethrough from any suitable source (not shown). When the superconductor 28 is immersed in a proper coolant (not shown) and the current through the superconductor 28 is less than the predetermined amount, it will be in a superconducting state and will function to shield the body 14 from the magnetic field H. When, however, the current through the superconductor 28 is greater than the aforementioned predetermined amount, the superconductor 28 will no longer be superconducting, and the magnetic field H will affect the body 14. Under these conditions, the resistance of the body 14 is markedly increased, and will function to decrease the current flowing in the closed circuit 12. Thus, the switch device 10 may serve as a switch, or current controlling means, in the closed circuit 12.

Figure 2:
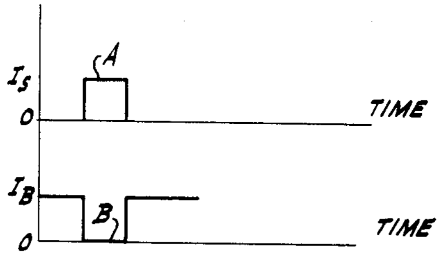
Fig. 2 is a graph of current flowing in the switching device shown in Fig. 1 during the operation thereof.

The operation of the switching device 10 of Fig. 1 is illustrated by the graph shown in Fig. 2. In the absence of current, $I_s$, flowing through the superconductor 28, a relatively large amount of current, $I_B$, will flow in the circuit 12, that is, through the body 14. Upon the occurrence of a positive-going pulse A of current through the superconductor 28, the superconductor 28 will be driven out of its superconducting state and will permit the magnetic field H to affect the body 14. Under these conditions, the resistance of the body 14 will be markedly increased and current through it, and also through the current 12, will decrease as shown by the negative-going pulse B in Fig. 2.

While the pulses A and B are shown to be of the same amplitude and of opposite phase, it will be understood that the amplitude of the pulse B is a function of the voltage source 24. Thus, the switching device 10 may function as an amplifier, and even as a generator, whereby pulses of current $I_S$ may control pulses of current $I_B$.

Figure 7:
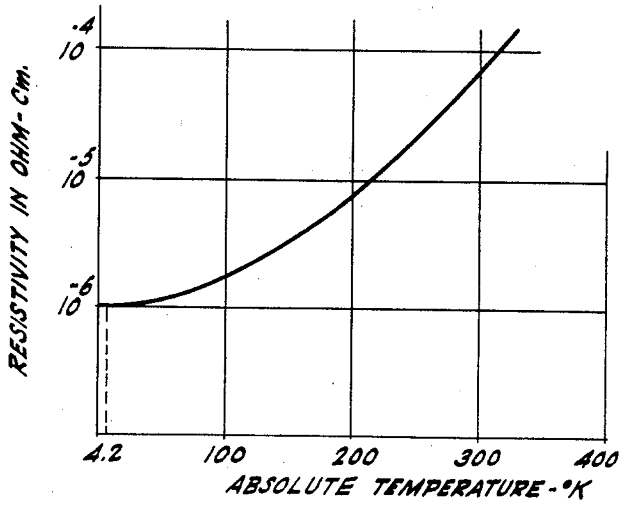
Fig. 7 is a graph of the resistivity, in the absence of a magnetic field, over a range of temperatures of a magneto-resistance element, such as bismuth, used in the current controlling devices of the present invention.

Referring now to Fig. 7 there is shown how the resistivity of a properly oriented single crystal of bismuth varies with absolute temperature, in the absence of a magnetic field. Thus, it will be seen that in the absence of a magnetic field the resistivity of bismuth at the temperature of liquid helium 4.2° K. is in the neighborhood of $10^{-6}$ ohm-cm.

Figure 8:
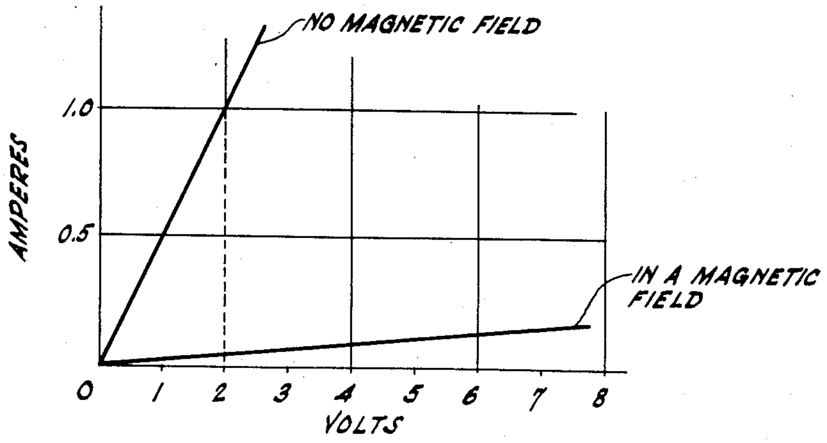
Fig. 8 is a graph of the voltage-current characteristics of a magneto-resistance body, such as bismuth, in both the presence and in the absence of a magnetic field.

The voltage-current characteristics of bismuth are shown in Fig. 8 in a magnetic field and in the absence of a magnetic field. It will be noted, from Fig. 8, that the voltage-current characteristics under both of these conditions are linear. It will also be noted that in a magnetic field, due to the relatively high resistivity of bismuth under this condition, the voltage-current characteristic of bismuth is a straight line with a relatively small slope. In the absence of a magnetic field, the voltage-current characteristic of bismuth is still linear, but now it has a relatively larger slope. Thus, it can be seen, from Fig. 8, that the current in a circuit, having a driving potential of two volts, for example, may be controlled by a factor of at least ten by the switching device 10.

Figure 3:
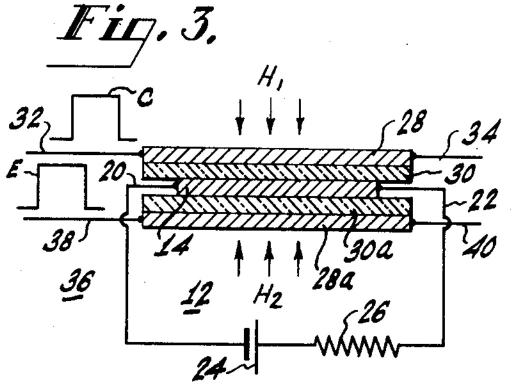
Fig. 3 is another embodiment of a novel switching device connected in a circuit in accordance with the present invention.

Referring now to Fig. 3, there is shown a modified current controlling device 36, in cross-section, wherein parts similar to those of the switching device 10, in Fig. 1, are given the same reference characters. In the device 36, a superconductor **28*a* is disposed parallel to the superconductor 28 on the opposite side of the body 14, and separated from the body 14 by an insulator 30*a*. The body 14 may be considered as sandwiched between the superconductors 28 and 28*a* and insulated therefrom by the insulators 30 and 30*a*. Current may be sent through the superconductor 28*a* from any suitable source (not shown) via leads 38 and 40, connected to opposite ends of the superconductor 28*a***, respectively.

It will be understood that the superconductor 28, in Fig. 3, is disposed between a magnetic field $H_1$ and the body 14, and the superconductor **28*a* is disposed between a second magnetic field $H_2$ and the body 14. The magnetic fields $H_1$ and $H_2$ are in colinear alignment with each other and are of substantially the same magnitude, but of opposite direction. Under these conditions, the current controlling device 36 may be used to affect the body 14 with either none, or one, or both of the magnetic fields $H_1$ and $H_2$. If the magnetic fields $H_1$ and $H_2$ are of opposite direction it will be understood that they will cancel each other at the body 14 when allowed to affect the body 14 by the superconductors 28 and 28*a***.

Figure 4:
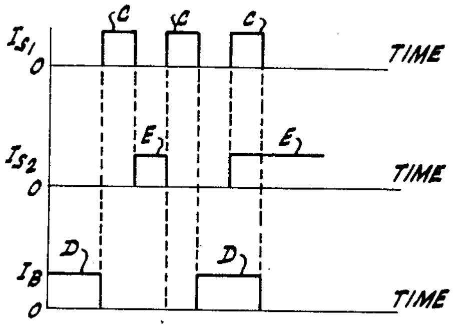
Fig. 4 is a graph of current flowing in the different parts of the novel device shown in Fig. 3 during the operation thereof.

The current controlling device 36 may be used to control current in the circuit 12 in accordance with pulses through the superconductors 28 and **28*a* of sufficient amplitude to drive them out of their superconducting state. Thus, referring to Fig. 4, it will be seen that in the absence of any pulse of current $I_{s1}$ and $I_{s2}$ through the superconductors 28 and 28*a*, respectively, a current, $I_B$, will flow through the body 14. This current flows in the circuit 12, as shown by the first current pulse D in Fig. 4. Upon the occurrence of a pulse C through the superconductor 28, the superconductor 28 will be driven out of its superconducting state and the magnetic field $H_1$ will affect the body 14. The resulting increased resistance of the body 14 will markedly diminish the current therethrough, and the current through the circuit 12** will be substantially cut off.

In a similar manner, a current pulse E through the superconductor **28*a* will permit the magnetic field $H_2$ to affect the body 14 and substantially cut off current in the circuit 12. It will also be noted that upon the simultaneous occurrences of both a pulse C and a pulse E, the magnetic fields $H_1$ and $H_2$ will cancel each other at the body 14. Under these conditions, the body 14 has a relatively low resistance and will permit current $I_B$ to flow through the circuit 12**, as illustrated by the second pulse D in Fig. 4.

The pulses C and D need only be large enough to cause the superconductors 28 and 28_a_ to be driven from a state of superconductivity to a state where their superconductivity is quenched. The amplitude of the current flowing through the load 26 in the circuit 12 is a function of the voltage source 24. The current controlling device 36 may be utilized in certain types of computers where an output pulse is desired upon the occurrence of two pulses simultaneously, or upon the absence of two pulses at the same time.

The current controlling devices 10 and 36 illustrate means for varying the current through a magneto-resistance body 14 in a phase relationship opposite to that of the phase of the current in the superconducting elements 28 and/or 28_a_. Where it is desired to vary the current through the magneto-resistance body 14 in phase with the current in the superconductor 28, a current controlling device 42, in Fig. 5, similar in structure to the device 10 may be used. The current controlling device 42 (Fig. 5) differs from the device 10 (Fig. 1) in that the body 14 is always under the influence of a magnetic field $H_3$. The magnetic field H can affect the body 14 only when the current through the superconductor 28 is of an amplitude sufficient to drive the superconductor 28 out of a superconducting state. The magnetic fields H and $H_3$ should be of the same amplitude and opposite direction, preferably, so that they may cancel each other at the body 14.

Figure 5:
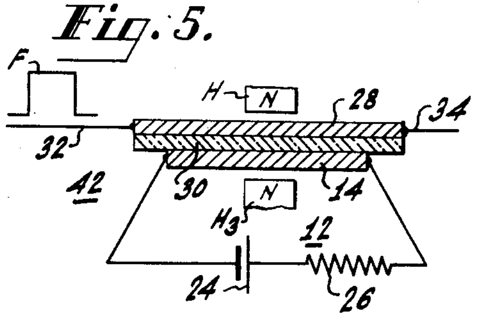
Fig. 5 is a further embodiment of a novel switching device connected in a circuit in accordance with the present invention.
Figure 6:
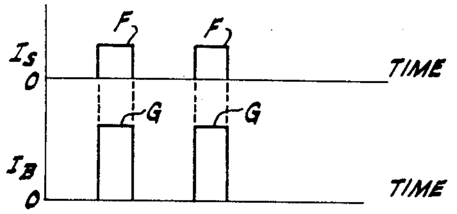
Fig. 6 is a graph of the current flowing in the different parts of the novel device shown in Fig. 5 during the operation thereof.

The operation of the current controlling device 42 of Fig. 5 will be illustrated with the aid of the graph of Fig. 6. When the superconductor 28 is in a superconducting state, it acts as a shield to prevent the magnetic field H from affecting the body 14. The body 14, however, is already affected by the magnetic field $H_3$. Under these conditions, current in the circuit 12 is substantially cut off. When a current pulse F is sent through the superconductor 28 so that the superconductor 28 is driven out of its superconducting state, the magnetic field H will penetrate the superconductor 28 and neutralize the magnetic field $H_3$. The body 14 will now have a relatively low resistance and a pulse G of current will flow in the circuit 12. It will be noted that a positive-going pulse F in the circuit containing the superconductor 28 results in a positive-going pulse G in the circuit 12 containing the body 14. In each of the current controlling devices 10, 36, and 42 the body 14 shows a maximum magneto-resistance when it is oriented so that the applied magnetic field is perpendicular to the trigonal axis of the body 14, that is, to the direction of current flow through the body 14, and also perpendicular to one of the binary axes 18. In each device the superconductor should be wide enough to act as a physical shield for the magnetic field when the superconductor is in a superconducting state.

Thus, there has been shown and described, in accordance with the objects of the present invention, current controlling devices having a controlling element that has a linear voltage-current characteristic, and having a resistivity at relatively low temperatures that is a function of the strength of the magnetic field applied to it. The devices of the present invention may be used to control current in a circuit that is in phase or out of phase with the controlling signal. The output signal may also be in an amplified state. With the devices of the present invention, it is also possible to generate repetitive signals at frequencies in the order of kilomegacycles per second. This is possible because the relaxation times involved in magneto-resistance effects are of the order of $10^{-11}$ seconds. Also, the changes in the resistivity of a bismuth body are such that a current controlling device employing such a body are easily adapted for use with low impedance loads.

What is claimed is:

1. A current controlling device comprising means to provide a magnetic field, a body of material whose resistivity varies sharply with the strength of a magnetic field applied to it, and a superconducting material insulated from said body and disposed adjacent thereto in a manner to subject said body to said magnetic field only when a predetermined amount of current is passed through said superconducting material, said body having a linear voltage-current characteristic.

2. A current controlling device comprising means to provide a magnetic field, a body of material whose resistivity varies sharply with the strength of a magnetic field applied to it, and a superconducting material insulated from said body and disposed adjacent thereto in a manner to expose said body to said magnetic field only when a predetermined amount of current is passed through said superconducting material, said body having a linear voltage-current characteristic at temperatures in and adjacent to the range of temperatures at which said superconducting material is operable as a superconductor.

3. A current controlling device comprising means to provide a magnetic field, a body of material whose resistivity varies sharply with the strength of a magnetic field applied to it and whose voltage-current characteristic in a constant magnetic field and at the temperature of liquid helium is linear, and a superconducting material insulated from said body and disposed adjacent thereto in a manner to shield said body from said magnetic field when less than a predetermined amount of current is passed through said superconducting material.

4. A current controlling device comprising a body of material whose resistivity varies with the strength of a magnetic field applied to it, means to provide a magnetic field, a superconductor disposed between said magnetic field and said body and insulated from said body, means to send current through said superconductor whereby to quench its superconducting property and to allow said magnetic field to penetrate said superconductor, and means to connect said body in a circuit, said body having a trigonal axis perpendicular to the direction of said magnetic field.

5. A current controlling device comprising a single crystal having a trigonal axis and possessing the characteristic of magneto-resistance at low temperatures, means to connect said crystal in a circuit so that current will flow therethrough in the direction of said trigonal axis, a superconducting material adjacent to said crystal, means to insulate said superconducting material from said crystal, and means connected to said superconducting material to send current through it.

6. A current controlling device comprising a body of material whose resistivity varies with the strength of a magnetic field applied to it, means to provide a magnetic field, a superconductor disposed between said magnetic field and said body and insulated from said body, means to send current through said superconductor, and means to connect said body in a circuit, said body having a linear voltage-current characteristic.

7. A switching device comprising a single crystal of an element having a trigonal axis and having the property of magneto-resistance, said crystal also having a linear voltage-current characteristic, means to connect said crystal in a circuit, a film of superconducting material superimposed on said crystal and electrically insulated therefrom, and means to pass a current through said film, said film being adapted to shield said crystal from a magnetic field when said film is at a predetermined temperature and said current through said superconducting material is less than a predetermined amount.

8. A switching device comprising a body formed from a single crystal of an element having the property of magneto-resistance and having a linear voltage-current characteristic, means to connect said body in a circuit, a film of superconducting material superimposed on said body and electrically insulated therefrom, and means to pass a current through said film, said film being adapted to subject said body to a magnetic field when said film is at a predetermined temperature and said current through said film is greater than a predetermined amount.

9. A current controlling device comprising means providing a magnetic field, a body of bismuth formed from a single crystal having a trigonal axis, means to connect said body in said circuit so that current will flow through said body in the direction of said trigonal axis, a superconducting material surrounding at least a portion of said body and being insulated therefrom, and means to send current through said superconducting material, said superconducting material comprising means to shield said body from said magnetic field when it is in a superconducting state and to permit said magnetic field to penetrate therethrough when it is driven out of its superconducting state by said current passing therethrough.

10. A switching device comprising a body formed from a single crystal of bismuth, said bismuth crystal having a trigonal axis and binary axes, means to apply a magnetic field perpendicular to said trigonal axis and perpendicular to one of said binary axes, a superconductor superimposed between said magnetic field and said body, said superconductor being insulated from said body, and means to connect said body in a current so that current passing through said body will move in the direction of said trigonal axis.

11. A device for controlling current in a circuit, said device comprising a body of bismuth formed from a single crystal having a trigonal axis and a binary axis, means to dispose a separate superconducting material on opposite sides of said body and electrically insulated from said body, means to apply a separate magnetic field to each of said superconductors, each of said magnetic fields being perpendicular to said trigonal and binary axes, means to connect said body in said circuit so that current flows through said body along said trigonal axis, and means to send current through each of said superconductors.

12. A device for controlling current in a circuit, said device comprising a body of bismuth formed from a single crystal having a trigonal axis and a binary axis, means to dispose a separate superconducting member on opposite sides of said body and electrically insulated from said body, means to apply a separate magnetic field to each of said superconducting members, each of said magnetic fields being substantially perpendicular to said trigonal and binary axes, means to connect said body in said circuit so that current will flow through said body in a direction perpendicular to said magnetic fields, and means to send current through each of said superconducting members.

13. A device for controlling current in a circuit, said device comprising a body whose resistivity varies with the strength of a magnetic field applied to it, means to dispose a separate superconducting member on opposite sides of said body and electrically insulated from said body, means to connect said body in said circut, and means to apply current through each of said superconducting members, and said body having a linear voltage-current characteristic at temperatures in and adjacent to the range of temperatures at which said superconducting members are operable as superconductors.

14. A device for controlling current in a circuit comprising a body formed from a single crystal of bismuth having a trigonal axis and a binary axis perpendicular to said trigonal axis, means to apply a first magnetic field to said body, a superconductor surrounding a portion of said body and insulated therefrom, means to apply a second magnetic field to said superconductor, and means to send current through said superconductor, said superconductor being disposed to shield said body from said second magnetic field only when said superconductor is in a superconducting state.

15. A device for controlling current in a circuit comprising a body formed from a single crystal of bismuth having a trigonal axis and a binary axis perpendicular to said trigonal axis, means to apply a first magnetic field to said body, a superconductor covering a portion of said body and insulated therefrom, means to apply a second magnetic field to said superconductor, and means to send current through said superconductor, said superconductor comprising means to shield said body from said second magnetic field only when said superconductor is in a superconducting state, and said first and said second magnetic fields being disposed in opposite directions to each other.

16. A device for controlling current in a circuit comprising a body whose resistivity varies with the strength of a magnetic field applied to it, means to apply a first magnetic field to said body, a superconductor covering a portion of said body and insulated therefrom, means to apply a second magnetic field to said superconductor, and means to send current through said superconductor, said superconductor comprising means to shield said body from said second magnetic field only when said superconductor is in a superconducting state, and said body having a linear voltage-current characteristic at temperatures in and adjacent to the range of temperatures at which said superconductor is superconducting.

17. A current controlling device comprising a crystal possessing the characteristic of magneto-resistance at low temperatures, means to connect said crystal in a circuit so that current may flow therethrough, a superconducting material adjacent to said crystal and insulated therefrom, and means connected to said superconducting material to send current through it.

References Cited in the file of this patent

UNITED STATES PATENTS

| | | |
|---|---|---|
| 2,659,043 | Taylor | Nov. 10, 1953 |
| 2,666,884 | Ericsson et al. | Jan. 19, 1954 |
| 2,832,897 | Buck | Apr. 29, 1958 |